United States Patent [19]
Shupe et al.

[11] 3,946,814
[45] Mar. 30, 1976

[54] METHOD FOR OIL RECOVERY

[75] Inventors: Russell D. Shupe; Jim Maddox, Jr.; Jack F. Tate, all of Houston, Tex.

[73] Assignee: Texaco Inc., New York, N.Y.

[22] Filed: Dec. 20, 1974

[21] Appl. No.: 534,956

[52] U.S. Cl............... 166/308; 166/312; 166/305 R
[51] Int. Cl.²..................... E21B 43/25; E21B 43/26
[58] Field of Search........ 166/305 R, 307, 273–275, 166/281, 282, 312; 252/8.55 D, 8.55 C, 8.55 R

[56] References Cited
UNITED STATES PATENTS

| | | | |
|---|---|---|---|
| 3,455,386 | 7/1969 | Reisberg | 166/275 |
| 3,508,612 | 4/1970 | Reisberg et al. | 166/275 X |
| 3,515,214 | 6/1970 | Finch | 166/274 X |
| 3,572,440 | 3/1971 | Hutchison et al. | 166/307 X |
| 3,578,781 | 5/1971 | Abrams et al. | 116/305 |
| 3,791,446 | 2/1974 | Tate | 166/307 |

Primary Examiner—Stephen J. Novosad
Attorney, Agent, or Firm—T. H. Whaley; C. G. Ries; James F. Young

[57] ABSTRACT

The production of hydrocarbons from a subterranean hydrocarbon-bearing formation is stimulated by injecting into the formation an aqueous solution of a compound hereinafter described. The elimination of plugging of capillary openings within the formation and mineral scale deposition on production equipment due to post-precipitation of dissolved salts subsequent to treatment by means of said compound results in a substantial improvement in hydrocarbon recovery.

10 Claims, 1 Drawing Figure

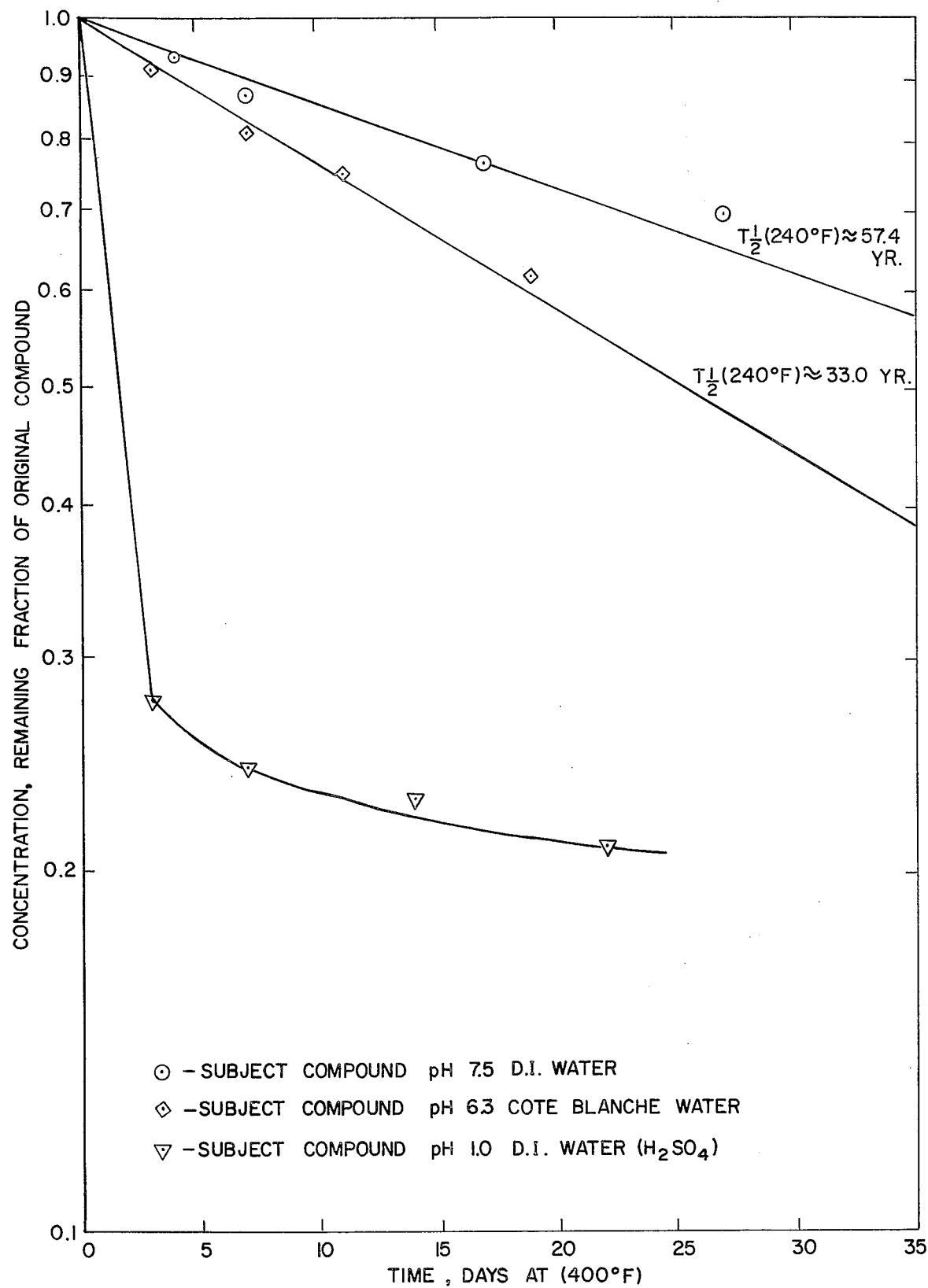

METHOD FOR OIL RECOVERY

FIELD OF THE INVENTION

This invention relates to a method for stimulating the production of fluids from earthen formations. More particularly, this invention relates to a method in which the productivity of a hydrocarbon-bearing formation is improved upon treatment of the formation with an aqueous solution of a compound later described, said compound effecting the elimination of plugging of capillary openings due to post-precipitation of sparingly soluble salts, effecting elimination of mineral scale on production equipment such as pumps, tubing, etc., caused by such precipitation, and effecting enhanced oil recovery by reduction of retentive forces of capillarity.

DESCRIPTION OF THE PRIOR ART

The technique of increasing the deliverability of a subterranean hydrocarbon-bearing formation by injection of water and thereby stimulating the production of fluids therefrom has long been practiced in the art. The technique is applicable in both limestone and sandstone. In the usual treatment procedure, the aqueous medium is introduced into the well and under sufficient pressure is forced into the adjacent subterranean formation where it dissolves formation components, particularly the carbonates such as calcium carbonate and magnesium carbonate.

During the stimulation process passageways for fluid flow are created or existing passageways therein are enlarged thus stimulating the production of oil, water, brines and various gases. If desired, the stimulation may be carried out at an injection pressure sufficiently great to create fractures in the strata or formation which has the desired advantage of opening up passageways into the formation along which the aqueous medium can travel to more remote areas from the well bore.

There are, however, troublesome complications attending the use of this process. After stimulation is completed, the well is put back on production. The sparingly soluble carbonates, dissolved at the higher reservoir temperatures, may re-precipitate as temperature and hence solubility decrease. Such precipitation, when it occurs within the capillaries of a tight formation or on the tubing or annulus as a mineral scale, can severely lessen production rate by plugging such capillaries or well equipment. In actual practice, the short-lived effectiveness of some stimulations is attributed to salt re-deposition.

In addition, with the exception of increasing the drainage area, and therefore the average permeability by matrix dissolution or hydraulic fracturing, little benefit is obtained. The complete immiscibility of the oil in the water and the retentive forces of capillarity which maintain the oil in the matrix severely limit the production of incremental oil by mere injection of water alone.

It is therefore, the principal object of the present invention to overcome the defects of the prior art in treating fluid-bearing formations such as hydrocarbon-bearing formations, etc., by providing a method of and composition for stimulation employing the novel composition of this invention.

SUMMARY OF THE INVENTION

This invention encompasses and includes a method for increasing the production of fluids from a subterranean fluid-bearing formation comprising injecting down the well bore to said formation and therefrom into said formation under a pressure greater than the formation pressure an aqueous solution of a compound hereinafter more fully described, optionally containing a propping agent therewith, maintaining said aqueous solution in contact with the formation strata for a time sufficient for the compound to chemically interact with the components of the formation.

The novel method of this invention uses an aqueous solution having dissolved therein a compound hereinafter described. The concentration of the compound present in the aqueous solution is such that it is capable of interacting with the soluble components of the fluid-bearing strata so as to prevent reprecipitation of sparingly soluble salts and enhance oil production by reducing retentive forces of capillarity.

BRIEF DESCRIPTION OF THE DRAWING

The FIGURE of the drawing graphically illustrates the thermal stability of the compound of Example IV of the present invention.

DETAILED DESCRIPTION OF THE INVENTION

In its broadest embodiment the method for the present invention comprises introducing into a subsurface formation an aqueous solution of a compound hereinafter described wherein the said solution is maintained in contact with the formation for a time sufficient to chemically interact with the formation so as to increase substantially the oil-producing efficiency of the formation by reducing interfacial tension and hence retentive forces of capillarity. The selection of the correct compound to effect such a reduction in interfacial tension is based upon the formation water salinity, hardness, temperature and other operating variables. This selection may be made basis laboratory displacement tests.

An advantage resulting from the employment of the method of this invention in stimulating fluid-bearing formations is that the post-precipitation of dissolved carbonates is prevented or materially decreased. Such post-precipitation occurs because the salts become less soluble as temperatures decrease. Such a decrease occurs as the fluids approach the production equipment. Such post-precipitation occurring within the formation matrix near the bore hole can decrease permeability by plugging the formation capillaries, particularly those near the well bore, and result in a lower production rate. Furthermore, such post-precipitation can occur in the tubing or annulus of the well itself and manifest itself as mineral scale, reducing their diameter(s) and resulting in a lower production rate.

The compound used in preparing the aqueous solution of the present invention is a water-soluble sulfonated, ethoxylated compound having the general formula:

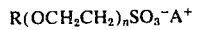

wherein R is an aliphatic hydrocarbon group containing from about 8 to about 20 carbon atoms, $n$ is a number from one to about 10 including fractions, and $A^+$ is a monovalent cation selected from the group consisting of sodium, potassium, and ammonium, including mixtures.

Representative examples of compounds useful in the practice of the invention include the sulfonated, ethoxylated octyl, decyl, dodecyl, tridecyl, tetradecyl, pentadecyl, hexadecyl, heptadecyl, octadecyl, nonadecyl, and eicosyl alcohols and also the branched chain isomers thereof. The alcohols can be either a primary or secondary alcohol or a mixture of any of these alcohols.

The ethoxy portion of the alcohol can be, for example, di-, tri-, tetra-, penta-, hexa-, octa-, nona-, and deca.

A particularly preferred group is the $C_{12}$–$C_{18}$ primary alcohols containing from about 3 to 10 ethoxy groups therein, and especially the sodium and ammonium salts of these materials.

The concentration of the compound in the aqueous solution can vary from about 0.005% to about 2% by weight, preferably from about 0.05% to about 1% by weight.

In carrying out the method of this invention, an aqueous solution is prepared by mixing the compound with water at the desired concentration. The thus-prepared aqueous solution is forced, usually via a suitable pumping system, down the well bore and into contact with the production equipment and formation to be treated. As those skilled in the art will readily understand, the pressure employed is determined by the nature of the formation, viscosity of the fluid, and other operating variables. The stimulation method of this invention may be carried out at a pressure sufficient merely to penetrate the formation or it may be of sufficient magnitude to overcome the weight of the over-burden and create fractures in the formation. Propping agents, to prop open the fractures as created, for example 20 to 60 mesh sand, in accordance with known fracturing procedures, may be employed in admixture with the aqueous compound. The solution is best kept in contact with the formation and production equipment until the compound can adsorb upon the formation matrix and reduce the interfacial tension. After this, the treating solution is reversed out of the well, i.e., it is allowed to flow back out or to be pumped out of the formation.

In the method of this invention, the compound in the aqueous solution provides means whereby calcium ions having tendencies to precipitate as $CaCO_3$ or $CaSO_4$ that is produced by the reaction of the aqueous system with the formation, does not precipitate from the spent treating solution. This binding up of the aforementioned calcium ions from weakly ionizable compounds permits the formed calcium-compound complex to remain dissolved in the treating solution and pass through the formation pores and production equipment.

Further, the compound of the invention provides means whereby the nucleation and growth of the solid itself is thwarted, so that solid calcium carbonate does not precipitate from the spent treating solution.

Further, the compound or the invention provides means whereby continuous protection against post-precipitation of $CaCO_3$, or $CaSO_4$ is obtained for a considerable period of time subsequent to treatment due to continuous slow desorption of the compound from the formation surfaces. In contrast, use of surfactants having merely dispersant and suspending properties and not possessing the capability of molecularly binding up these produced calcium ions or thwarting the nucleation and growth of the solid $CaCO_3$ will permit deposition of calcium carbonate or calcium sulfate to occur from such treating solution with the likelihood of plugging the formation passageways and production equipment during subsequent recovery of desirable formation hydrocarbons therethrough. Finally, the compound of the invention reduces the retentive forces of capillarity within the formation providing enhanced oil recovery over treatment with water alone.

Following is a description by way of example of the method of the invention.

EXAMPLE I

A producing well in the Lincoln Southwest Field is treated in the following manner.

A treating mixture is prepared by mixing 10,000 gallons of source pond water containing about 200,000 ppm of total dissolved solids with 90 gallons of the sodium salt of sulfonated, pentaethoxylated mixed $C_{12}$–$C_{18}$ alcohols. Fifteen thousand pounds of frac sand is added to the aqueous surfactant admixture. The treating mixture is introduced into the formation at a rate of about 7 BPM a 3,000 psig. The shut-in tubing pressure is 2,500 psig. which bled down to zero in a short time. The well is shut in for 13 hours and then returned to production. Estimated production rate increase is from 50 BOPD to 300 BOPD.

EXAMPLES II–IV

The procedure set forth in Example I above is repeated using

II — Sulfonated, triethoxylated mixed $C_{12}$–$C_{18}$ alcohols containing 40% dodecyl, 30% tetradecyl, 20% hexadecyl, and about 10% octadecyl groups, sodium salt.

III — Sulfonated, triethoxylated mixed $C_{10}$–$C_{14}$ alcohols containing 80% decyl, 10% dodecyl, and 10% tetradecyl groups, sodium salt.

IV — Sulfonated, pentaethoxylated mixed $C_{10}$–$C_{14}$ alcohols containing 85% decyl, 9% dodecyl, and 6% tetradecyl groups, sodium salt.

It has been found that the compounds used in the method of the present invention are especially effective in the presence of high calcium ion concentrations to 1% by weight or more, and particularly and somewhat uniquely in applications where high aqueous solution temperatures are encountered such as about 100°C. The compounds of the present invention are temperature-stable and effective as scale inhibitors at temperatures up to about 150°C., e.g. 100°–150°C.

The unusual thermal stability of one of the species of the compounds is graphically shown by the accompanying drawing.

In the drawing the graph is constructed on one cycle semi-logarithmic paper having 70 linear divisions along the abscissa.

These data were obtained using the compound of Example IV, above.

At normal operating pHs of 7.5 and 6.3 in deionized water and a representative field water, respectively, half lives at 116°C. (240°F.) are 57.4 and 33 years. The actual experiments were conducted at 400°F., and the half lives extrapolated to 240°F. It is seen that at pH 6.3 in field water at as high a temperature as 204.5°C. (400°F.), a half life of 25 days is attained. At a pH of 1, 23% activity remained after 15 days at 400°F.

In a separate experiment the unusual stability of the compounds is again exhibited by the fact that after exposure of an aqueous solution of the compound of Example I to a temperature of 177°C. for 5 days, 93.5% activity remained.

The disclosed compounds may be prepared in the following manner:

The ethoxylated alcohol is reacted with thionyl chloride for about 18 hours at about 100°C., to form the monochloro derivative, followed by reaction of said monochloro derivative with sodium sulfite for about 18 hours at about 155°C., in a 1/1 by volume admixture of water and ethanol in a Paar Bomb. The resulting recovered sulfonated product, on analysis, showed about 75% sulfonation of the terminal ethoxy group.

This method of preparation is exemplary only, but was the method employed to prepare the tested compositions. Those skilled in the art may perceive other synthetic schemes.

For example, the sulfonated ethoxylated alcohols of the present invention can be prepared from sulfated ethoxylated alcohols by treatment with sodium sulfite at 200°C. for about 10–12 hours, resulting in relatively high yields (75–80%) of the desired sulfonate. The (sulfate) starting material, can be prepared by reaction of an ethoxylated aliphatic alcohol, including mixtures thereof with such reagents as sulfuric acid or chlorosulfonic acid to obtain the sulfated ethoxylated alcohol.

The compounds in Examples I–II above were prepared by reacting a commercially available mixed $C_{12}$–$C_{18}$ alcohols (Conoco-Alfol 1218) with ethylene oxide to adduct thereto 5 and 3 ethoxy groups respectively. The resulting respective ethoxylated alcohols were then sulfonated as described above. In a similar manner, the compounds of Examples III and IV were prepared using commercially available mixed $C_{10}$–$C_{14}$ alcohols, (Conoco Alfols 1014 and 1012).

Obviously, many modifications and variations of the invention as hereinabove set forth may be made without departing from the spirit and scope thereof, and therefore only such limitations should be imposed as are indicated in the appended claims.

We claim:

1. Method of increasing and sustaining the production of fluids from a subterranean fluid-bearing formation comprising injecting down the well bore penetrating said formation and injecting therefrom into said formation under a pressure greater than the formation pressure, an aqueous solution consisting essentially of water and a water-soluble sulfonated, ethoxylated compound having the general formula $$R(OCH_2CH_2)_nSO_3^-A^+$$

wherein R is an aliphatic hydrocarbon group containing from about 8 to about 20 carbon atoms, $n$ is a number from 1 to about 10, including fractions, and $A^+$ is a monovalent cation selected from the group consisting of sodium, potassium, and ammonium, including mixtures.

2. Method as claimed in claim 1, wherein said compound is present in said aqueous solution in an amount of from about 0.05% to about 1% by weight.

3. Method as claimed in claim 1, wherein said compound is the sodium salt of a sulfonated pentaethoxylated dodecyl alcohol.

4. Method as claimed in claim 1, wherein said compound is the sodium salt of a sulfonated hexaethoxylated hexadecyl alcohol.

5. Method as claimed in claim 1, wherein said compound is the sodium salt of a sulfonated heptaethoxylated pentadecyl alcohol.

6. Method as claimed in claim 1, wherein said compound is the sodium salt of a sulfonated pentaethoxylated mixed $C_{12}$–$C_{18}$ aliphatic alcohol.

7. Method as claimed in claim 1, wherein said compound is the sodium salt of a sulfonated, pentaethoxylated mixed $C_{12}$–$C_{18}$ aliphatic alcohol containing from about 35 to 45% $C_{12}$ alkyl, 25 to 35% $C_{14}$ alkyl, 15 to 25% $C_{16}$ alkyl and 5 to 15% $C_{18}$ alkyl groups.

8. Method as claimed in claim 1, wherein a frac sand is also present in said solution.

9. Method as claimed in claim 1, wherein the said aqueous solution is injected down the well bore penetrating said formation under a pressure greater than the formation pressure and sufficient to create fractures in the formation.

10. Method as claimed in claim 1, wherein the said aqueous solution is injected down the well bore penetrating said formation under a pressure greater than the formation pressure but less than the pressure required to create fractures in the formation.

* * * * *